UNITED STATES PATENT OFFICE.

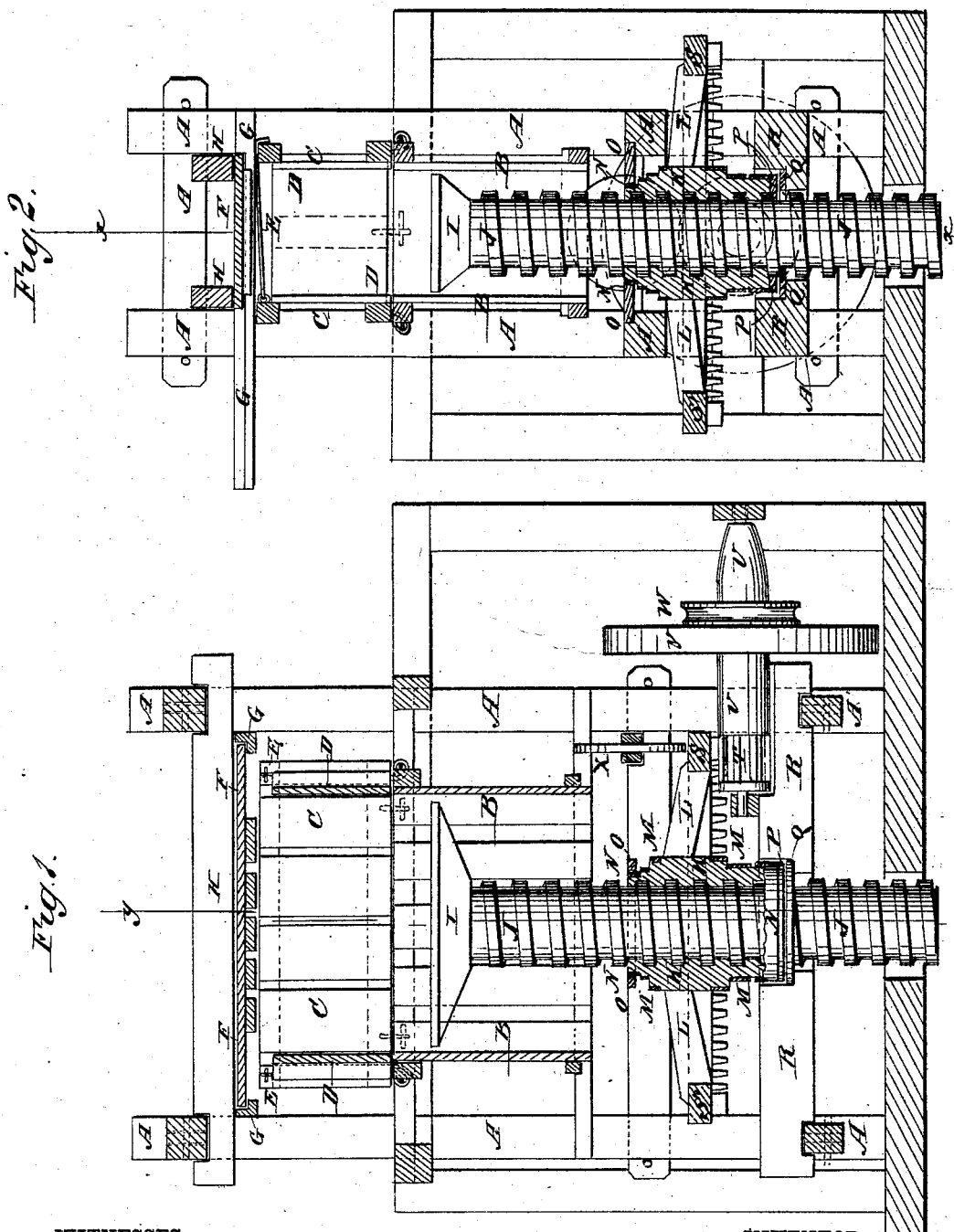

WILLIAM C. JONES, OF COFFEEVILLE, MISSISSIPPI.

BALING-PRESS.

SPECIFICATION forming part of Letters Patent No. 247,923, dated October 4, 1881.

Application filed July 20, 1881. (No model.)

*To all whom it may concern:*

Be it known that I, WILLIAM COWEN JONES, of Coffeeville, in the county of Yalabusha and State of Mississippi, have invented a new and useful Improvement in Baling-Presses, of which the following is a full, clear, and exact description.

Figure 1 is a sectional side elevation of my improvement, taken through the line $x\ x$, Fig. 2. Fig. 2 is a sectional end elevation of the same, taken through the line $y\ y$, Fig. 1.

The object of this invention is to facilitate the operation of baling cotton and other substances, and promote convenience in operating the presses.

The invention consists in a baling-press constructed with a frame, a baling-box having the upper parts of its sides and ends hinged at their lower edges, and provided at their upper edges with fastening-hooks, the head-block, the follower, the screw, the large gear-wheel, having its screw-hub strengthened with bands, and provided at its lower end with washers to receive the wear, the small gear-wheel, and the shaft and unequal band-pulleys, whereby the follower will be run up with great power and run down with great speed, as will be hereinafter fully described, and pointed out in the claims.

A represents the frame of the press, to the upper part of which is secured the baling-box B. The upper parts, C D, of the sides and ends of the baling-box are hinged at their lower edges to the frame A, so that they can be turned down for convenience in removing the bale. The side edges of the ends D, when raised, rest in grooves or slots in the end parts of the sides C, to support the said ends against the outward pressure. The sides C, when raised, are supported against the outward pressure by hooks E, hinged to the upper edge of one of said sides, and hooking upon the upper edge of the other side, as shown in Fig. 2. The head-block F rests in rabbeted bars G, attached to the frame A, and which project at one side of the said frame, to allow the head-block F to be slid out for convenience in inserting the material to be pressed. The head-block F, when in place over the baling-box, is supported against the upward pressure by bars H, attached to the frame A.

I is the follower, which moves up and down within the baling-box, and to the lower side of which is attached the upper end of a screw, J. The screw J passes through the hub K of the large gear-wheel, which has a screw-thread formed in its inner surface to fit into the screw-thread of the screw J. The hub K, above and below the spokes L, is strengthened by bands M. The ends of the hub K are strengthened by bands N, which also serve to receive the wear. The upper end of the hub K works in a bearing, O, attached to the frame A. The lower end of the hub K has a washer, P, attached to it, which rests upon a washer, Q, placed in the bottom of the recess in the bars R, in which the said lower end of the hub K works. The bars R are securely attached to the frame A, and are made strong to sustain the downward pressure.

To the outer ends of the spokes L is attached the rim S, which has gear-teeth formed upon its lower side to mesh into the teeth of the small gear-wheel T, attached to the shaft U, which revolves in bearings in the frame A, and has a large band-pulley, V, attached to its outer part to receive the driving-belt when running the screw up to compress the bale, and a smaller band-pulley, W, to receive a driving-band when running the screw down to obtain greater speed. With this construction, when the gear-wheel K L S is turned in one direction the screw J and follower I will be forced upward with great power, and when the said gear-wheel K L S is turned in the other direction the screw J and follower I are lowered to allow material for another bale to be placed in the baling-box.

The press can be operated by steam-power, water-power, horse-power, or by hand, as may be convenient.

The gear-wheel K L S is held in mesh with the gear-wheel T by a pulley, X, pivoted to the frame A in such a position as to rest upon the rim of the said gear-wheel K L S, directly over the said gear-wheel T, as shown in Fig. 1.

Having thus described my invention, I claim as new and desire to secure by Letters Patent—

1. A baling-press constructed, substantially as herein shown and described, of a frame, A, a baling-box, B, having the upper parts, C D, of its sides and ends hinged, and provided with fastening-hooks E, the head-block F, the follower I, the screw J, the large gear-wheel K L S, having its screw-hub strengthened by bands M N, and provided with washers P Q, the small gear-wheel T, and the shaft and band-pulleys U V W, as set forth.

2. In a baling-press, the combination, with the frame A and the follower I, of the screw J, the large gear-wheel K L S, having its screw-hub strengthened with bands M N, and provided with washers P Q, the small gear-wheel T, and the shaft U, and unequal band-pulleys V W, substantially as herein shown and described, whereby the follower can be run up with great power and run down with great speed, as will be hereinafter fully described.

WILLIAM COWEN JONES.

Witnesses:
S. M. ROSS,
R. J. GUTHRIE.